No. 695,279. Patented Mar. 11, 1902.
B. COLE.
CORN PLANTER.
(Application filed July 20, 1901.)

(No Model.) 2 Sheets—Sheet 1.

Witnesses
T. W. Riley
W. Arthur Maddox

Inventor
Bertie Cole,
By Victor J. Evans
Attorney

THE NORRIS PETERS CO., PHOTO-LITHO., WASHINGTON, D. C.

No. 695,279. Patented Mar. 11, 1902.
B. COLE.
CORN PLANTER.
(Application filed July 20, 1901.)
(No Model.) 2 Sheets—Sheet 2.
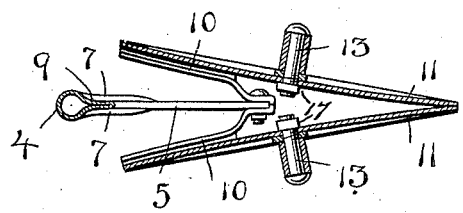
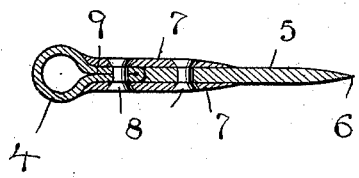
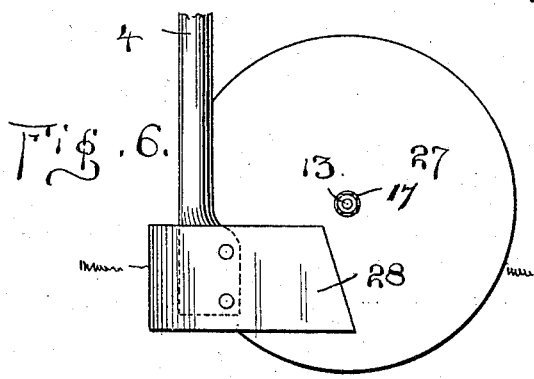
Witnesses
T. W. Riley,
W. Arthur Maddox
Inventor
Bertie Cole,
By Victor J. Evans
Attorney

UNITED STATES PATENT OFFICE.

BERTIE COLE, OF DALESBURG, SOUTH DAKOTA.

CORN-PLANTER.

SPECIFICATION forming part of Letters Patent No. 695,279, dated March 11, 1902.

Application filed July 20, 1901. Serial No. 69,124. (No model.)

*To all whom it may concern:*

Be it known that I, BERTIE COLE, a citizen of the United States, residing at Dalesburg, in the county of Clay and State of South Dakota, have invented new and useful Improvements in Corn-Planters, of which the following is a specification.

This invention relates to corn-planters and rotary colters; and its object is to provide a planter which will facilitate the planting of seed and which will enable the opening of hard ground for the reception of seed without requiring plowing of the land.

With these and other objects as pertain to the nature of the invention the latter consists, primarily, of a seed-tube having a pair of colters at its lower end arranged to stand at an angle to each other, their front ends approaching and their rear ends diverging, so as to form practically a wedge-shaped cutting edge.

The improvement also further consists of the novel features and the peculiar combination and construction of parts, which will hereinafter be more fully set forth and claimed and which are illustrated in the accompanying drawings, in which—

Figure 1:
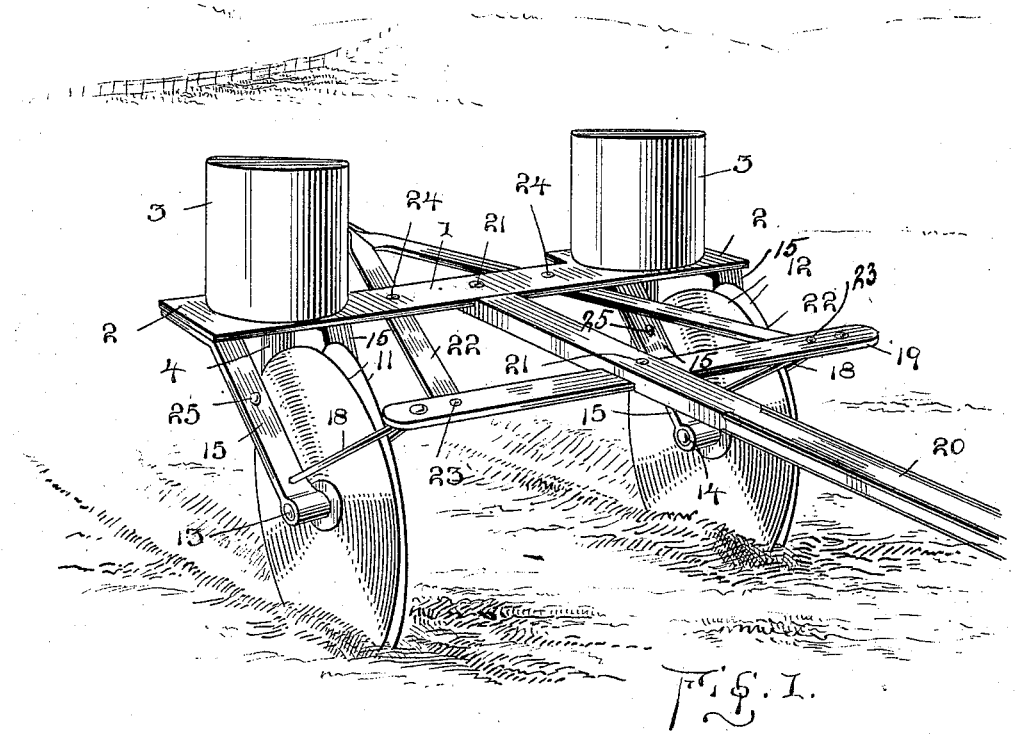
Figure 2:
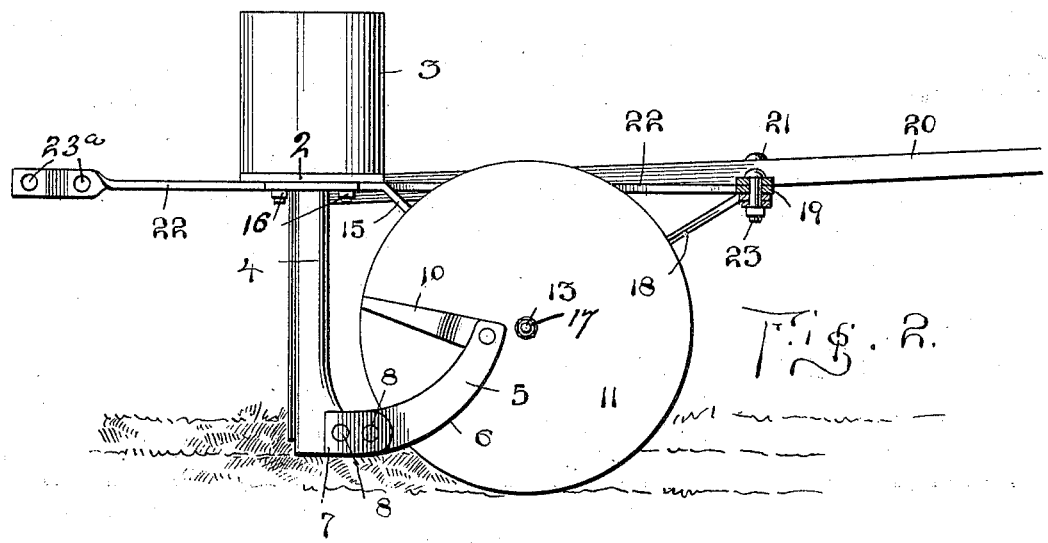

Figure 1 is a perspective view showing a portion of a corn-planter embodying my improvements. Fig. 2 is a side view of the mechanism, one of the disks being removed and the adjacent framework being shown in section. Fig. 3 is a horizontal cross-section of the colters and seed-tube. Fig. 4 is a horizontal cross-section of the seed-tube and shoe. Fig. 5 is a view in side elevation of my invention, parts being broken away. Fig. 6 is a modified form of my invention.

Referring now to the drawings, 1 designates the rear cross-beam of the planter-frame, which is enlarged at its outer ends 2 for the reception of the seed-hoppers 3 3. Leading downwardly from each hopper is a vertical delivery-chute 4, the lower end of which is adjacent the rear end of the furrow-cutting shoe 5, and with which rear end the chute is connected through the medium of the side strips 7, which are secured in place by bolts 8. The shoe 5 is provided with a cutting edge 6. The lower end of the delivery-chute 4 is enlarged, as in the usual construction, and has its front side crimped, as at 9, so as to provide means for the reception of one of the bolts 8. The shoe 5 extends forward in a horizontal plane, and its forward end is curved upward, as shown in Fig. 2.

To the free end of the curved portion of the cutting-shoe is mounted a pair of inner colter-scrapers 10 10, which are bent outward to come in contact with the rotary colters. 11 and 12 each designate a pair of disk colters, which are arranged on either side of the chutes 4 and mounted upon forwardly-inclined axles 13 and 14, journaled in the lower ends of frame-hangers 15. The frame-hangers 15 are secured by bolts 16 to the under side of the ends 2 of the rear cross-beam 1 of the frame. The hangers are so arranged that the peripheries of the two colters come together at one point, so that an edge view of them resembles the letter V, and these contiguous edges of the two colters form practically a wedge-shaped cutting edge.

The colter-axles are preferably of the ordinary bolt type, which through the medium of nuts 17 are held in position.

It will thus be seen that as the machine moves forward the revolving colters cut the ground and the shoe opens a furrow, and as the dropping-tube 4 is located in the widest portion of the space between the colters the grain is dropped into the furrow.

From the lower end of each pair of frame-hangers 15 two rods 18 extend forward and slightly converge upwardly to the front cross-bar 19 of the planter-frame, to which their front ends are secured. The front cross-bar 19 lies parallel to beam 1, and the planter-tongue 20 is secured thereto and to the rear cross-bar 1, equidistant of their ends, by bolt 21.

Secured by bolts 23, adjacent to the ends of the front cross-bar 19, are the forward ends of a pair of rearwardly-converging bars 22, which are united beyond the rear cross-bar 1 by bolts (not shown) located in bolt-holes 23ª, thereby forming a substantially triangular corn-planter frame, the rear cross-bar 1 serving as a brace and being secured thereto by bolts 24.

Secured to the frame-hangers 15 by bolts 25, adjacent to the periphery of the colters 10 and 11, are a pair of outer colter-scrapers 26.

In the modified form of my invention I employ but one colter 27, which is disposed to one side of the seed-tube 4 in the same manner as in the preferred form of my invention. Secured to the opposite side of the seed-tube 4, adjacent its lower end, is a cutting-blade 28, which is adapted to act as a divider and form a furrow into which the seed is dropped. The front edge of the cutting-blade 28 approaches the plane of the colter 27, and the colter and cutting-blade stand at an angle to each other and to the line of draft, so as to secure proper clearance for the depositing of the seed in the furrow formed by the colter and cutting-blade as the device is drawn over the field.

Having thus fully described my invention, what I claim as new, and desire to secure by Letters Patent, is—

1. The combination with a pair of converging colters, of a furrow-cutting shoe located between the colters, having an upwardly-extending cutter, and the inner colter-scrapers secured to the upper end of the cutter of the shoe.

2. The combination with a pair of converging colters, of a seed-delivery chute crimped at its front edge, a furrow-cutting shoe having an upwardly-extending cutter, side strips, and means whereby the front edge of the chute, the shoe and the strips are secured together.

3. The combination with a pair of converging colters, of a seed-delivery chute, a furrow-cutting shoe having an upwardly-extending cutter, means whereby the chute and shoe are secured together, and the inner colter-scrapers secured to the upper end of the cutter of the shoe.

In testimony whereof I affix my signature in presence of two witnesses.

BERTIE COLE.

Witnesses:
CHAS. N. MADEEN,
A. J. COLE.